(12) United States Patent
Dunlap

(10) Patent No.: US 7,291,241 B2
(45) Date of Patent: Nov. 6, 2007

(54) BONDED PART AND METHOD FOR PRODUCING SAME

(75) Inventor: Paul N. Dunlap, Littleton, CO (US)

(73) Assignee: The Gates Corporation, Denver, CO (US)

( * ) Notice: Subject to any disclaimer, the term of this patent is extended or adjusted under 35 U.S.C. 154(b) by 459 days.

(21) Appl. No.: 10/973,804

(22) Filed: Oct. 26, 2004

(65) Prior Publication Data

US 2005/0064212 A1    Mar. 24, 2005

Related U.S. Application Data

(62) Division of application No. 10/081,464, filed on Feb. 22, 2002, now Pat. No. 7,078,104.

(60) Provisional application No. 60/271,579, filed on Feb. 23, 2001.

(51) Int. Cl.
*B29C 65/00* (2006.01)
*B29C 43/00* (2006.01)
*F16F 15/129* (2006.01)

(52) U.S. Cl. .................. 156/245; 156/308.2; 156/311; 464/68.4

(58) Field of Classification Search ...................... None
See application file for complete search history.

(56) References Cited

U.S. PATENT DOCUMENTS

| 2,409,759 | A | 10/1946 | Hosking | 154/130 |
| 3,185,266 | A | 5/1965 | Hofmeister | 189/34 |
| 3,976,624 | A | 8/1976 | Inouye et al. | 260/79.5 |
| 3,981,762 | A | 9/1976 | Davis et al. | 156/322 |
| 4,096,009 | A | 6/1978 | Yoshida | 156/151 |
| 4,297,159 | A | 10/1981 | Dobias et al. | 156/307.7 |
| 4,300,973 | A | 11/1981 | Bezwada | 156/307.7 |
| 4,477,302 | A | 10/1984 | Leblanc et al. | 156/165 |

(Continued)

FOREIGN PATENT DOCUMENTS

JP    02261629    * 10/1990

(Continued)

OTHER PUBLICATIONS

Machine translation of JP 11-207859.*

*Primary Examiner*—Justin R. Fischer
(74) *Attorney, Agent, or Firm*—P. N. Dunlap, Esq.; C. H. Castleman, Esq.; J. A. Thurnau, Esq.

(57) ABSTRACT

A bonded part such as a rubber to metal bonded part and process for producing a bonded part including a rubber and metal part, and particularly for producing an automotive torsional vibration damper, comprising the steps of placing uncured elastomer composition comprising an elastomer, at least one curative, and preferably, at least one rubber-to-metal adhesive adjuvant into a shape-forming mold, and curing the elastomer in two stages, wherein in the first curing stage the elastomer composition is less than fully cured and in the second curing stage, preferably performed with the elastomer composition in contact with a metal surface of the rubber and metal part, the elastomer composition is at least substantially fully cured. According to one embodiment, the present invention allows for the elimination of the step of applying an adhesive to the metal surface prior to application of the elastomer composition.

26 Claims, 4 Drawing Sheets

U.S. PATENT DOCUMENTS

| | | | |
|---|---|---|---|
| 4,851,068 A | 7/1989 | Uyehara | 156/245 |
| 4,889,578 A | 12/1989 | Kei et al. | 156/294 |
| 5,288,446 A | 2/1994 | Noyama et al. | 264/108 |
| 5,300,569 A | 4/1994 | Drake et al. | 525/78 |
| 5,776,294 A | 7/1998 | Nagel | 156/307.7 |
| 6,171,194 B1 | 1/2001 | Haga et al. | 464/89 |

FOREIGN PATENT DOCUMENTS

JP          11-207859      *   8/1999

* cited by examiner

BONDED PART AND METHOD FOR PRODUCING SAME

CROSS REFERENCE TO RELATED APPLICATIONS

This application is a divisional of application Ser. No. 10/081,464 filed Feb. 22, 2002, now U.S. Pat. No. 7,078,104 which claims the benefit of priority of U.S. Provisional Patent Application No. 60/271,579, filed Feb. 23, 2001.

BACKGROUND OF THE INVENTION

The present invention relates to a bonded part comprising a rubber member bonded to a second substrate, and to a rubber-to-metal bonded part, and to a torsional vibration damper, and to a process for directly bonding rubber to at least a second substrate which may be a metal substrate, and to a method of bonding an intervening rubber member, which may optionally be applied under compression, between two metal members, such as in the manufacture of crankshaft torsional vibration dampers.

High strength bonding of rubber to substrates and particularly to metal substrates is desirable for numerous applications, including in the manufacture of rubber composite articles characterized by high and/or dynamic loading or extreme environmental conditions, e.g., tires, belts, rolls, seals and hose; and in those applications involving or calling for some level of vibration isolation and/or shock damping, e.g. vibration isolators such as engine mounts, vibration isolation mounts, vibration dampers, couplings, suspension bushings and transmission and axle seals.

A wide variety of methods have historically been employed to address one or another aspect of rubber-to-metal bonding, including improving adhesive strength, controlling the rubber compression or shrinkage level and/or increasing production efficiency, etc. In general, particularly in the area of vibration isolators and/or shock dampers, wherein an annular cured rubber member is disposed or sandwiched between two outer metal substrates, a limited level of mechanical bonding can be achieved by compressing the rubber member between outer metal members and relying on frictional forces between the rubber and metal surfaces. High strength rubber-to-metal bonding however is generally achieved through adhesive bonding of the fully vulcanized rubber member placed between the outer metal members through the action of one or more adhesives applied at the rubber-to-metal interface (hereafter, "post-vulcanization bonding"). An advantage of post-vulcanization bonding in the construction of parts wherein a rubber member is disposed between two outer metal surfaces is that since the rubber member is fully cured prior to its placement between the metal surfaces, it does not exhibit significant shrinkage and thereby resides under tension between the metal surfaces upon exposure to temperatures below its vulcanization temperature.

Alternatively, un-cured elastomeric material is introduced between the outer metal members to which a rubber-to-metal adhesive has been applied, and the elastomeric material is then fully cured in contact with the adhesive-coated metal substrate (hereafter, "vulcanization bonding"). A high degree of process control is required in the practice of this method in order to provide a homogeneous and consistent product. Moreover, dampers must be assembled relatively quickly after rubber mixing according to this method, which reduces production flexibility, and therefore, production efficiency. An additional disadvantage of conventional vulcanization bonding techniques in the construction of parts wherein a rubber member is disposed between two outer metal substrates is that since the rubber member is fully cured while in contact with each of the metal surfaces, it tends to exhibit at least some degree of shrinkage after curing, and thus resides under tension between the metal surfaces almost immediately as the exposure temperature falls below the vulcanization temperature, with adverse impact on the durability of the article.

In both of these methods, compression forces have also optionally been applied to provide further stabilization of rubber-to-metal engagement or to eliminate the tension resulting from shrinkage of the rubber.

In general, in each of the three conventional methods of press molding rubber or rubber-to-metal bonded assemblies exemplified by crankshaft torsional vibration dampers according to either vulcanization- or post-vulcanization bonding techniques, i.e., compression molding, transfer molding and injection molding, the problems associated with rubber-to-metal adhesives applied at the rubber-to-metal interface are essentially the same. First is the environmental concern; most such adhesives contain toxic constituents and are thus difficult and costly to handle, to store and to dispose of. Prior to the application of the rubber-to-metal adhesive, the relevant metal surface must moreover generally undergo intensive surface cleaning and preparation to ensure adequate bond strength. Furthermore, due to their typically volatile nature, the rubber-to-metal adhesive composition may sublimate or volatilize at vulcanization temperatures prior to the point at which adequate contact between the metal and the rubber is achieved, thereby decreasing the adhesive's efficiency, potentially causing fumes at the press and/or resulting in mold fouling. In addition, in vulcanization bonding processes there is the problem of "mold sweeping", whereby as molten rubber enters the mold cavities prior to curing, it flows across the adhesive-coated metal, tending to sweep along with it at least a portion of the adhesive, thus further reducing its efficiency.

U.S. Pat. No. 4,889,578 to Kei et al. describes a process for making a rubber vibration insulator including the steps of adhering, by vulcanization in combination with a metal adhesive at the rubber-to-metal interface, an un-vulcanized rubber layer to the outer surface of an inner metal fitting; adhering by vulcanization in combination with a metal adhesive at the other rubber-to-metal interface, another un-vulcanized rubber layer to the inner surface of an outer shell metal fitting; applying a halogen compound solution to the opposite, non-bonded surfaces of both of the rubber layers; press-fitting the inner metal fitting having the rubber layer to the outer shell metal fitting having the rubber layer such that the two rubber layers form a rubber-to-rubber interface, using a lubricant or a lubricating adhesive, and effecting adhesion between the vulcanized rubber layers through heating the above described mutually fitted bodies.

This process presents several drawbacks. In particular, the utilization of a halogen compound e.g., chlorinated or brominated polymers and sodium hypochlorite, or chlorinated cyanuric acid solution as a pretreatment agent, is still required to bond the adjacent vulcanized rubber surfaces. Moreover, the process is characterized by a plurality of labor steps; each of which introduces incremental cost increase to the process. In addition, the process relies nonetheless on the utilization of a rubber-to-metal adhesive on the metal surface prior to application of the rubber thereto in order to achieve satisfactory adhesion of the rubber to the metal.

SUMMARY OF THE INVENTION

The present invention provides a bonded article, comprising at least a cured rubber member disposed between a first outer member and a second outer member, wherein the rubber member is the reaction product of at least one elastomer, at least one adhesive adjuvant and at least one curative, and the rubber member is formed and arranged to reside between the outer members in at least one of a neutral state and a state of compression at a temperature in the range of from about −20° C. to about 120° C.

In a further embodiment, the present invention provides a method of producing a bonded part comprising a cured rubber member disposed between a first outer member and a second outer member. The method comprises the steps of placing an uncured elastomer composition comprising an elastomer, at least one curative and at least one adhesive adjuvant into a shape-forming mold, and curing the composition in at least two stages, wherein in a first curing stage the composition is less than fully cured and in a second curing stage, preferably performed with the partially cured elastomer composition in contact with at least one outer member surface, the elastomer composition is at least substantially fully cured.

According to one embodiment, the present invention allows for the elimination of the step of applying one or more adhesives to the outer member surface at the relevant interface prior to introduction of the elastomer composition.

In a further embodiment, the uncured elastomer composition comprises at least two curatives, each of which is characterized by distinct cure activation conditions, including temperature, exposure period and pressure. According to this embodiment, the first curing step is preferably performed in a shape-forming mold, by adjusting at least one of a first temperature, a first applied pressure and a first exposure period, in such a manner as to activate the first curative to a point wherein the elastomer composition is partially cured; and thereafter the second curing step is performed with the elastomer composition in contact with the outer member surface, optionally under compression of up to about 50%, through adjusting at least one of a second temperature, a second applied pressure and a second exposure period, in such a manner as to activate the second curative to a point wherein the elastomer composition is at least substantially fully cured.

BRIEF DESCRIPTION OF THE DRAWINGS

Other objects and advantages of the present invention will become apparent from the following description and accompanying drawings, in which like reference numerals denote like parts, and.

DETAILED DESCRIPTION

Figure 1:
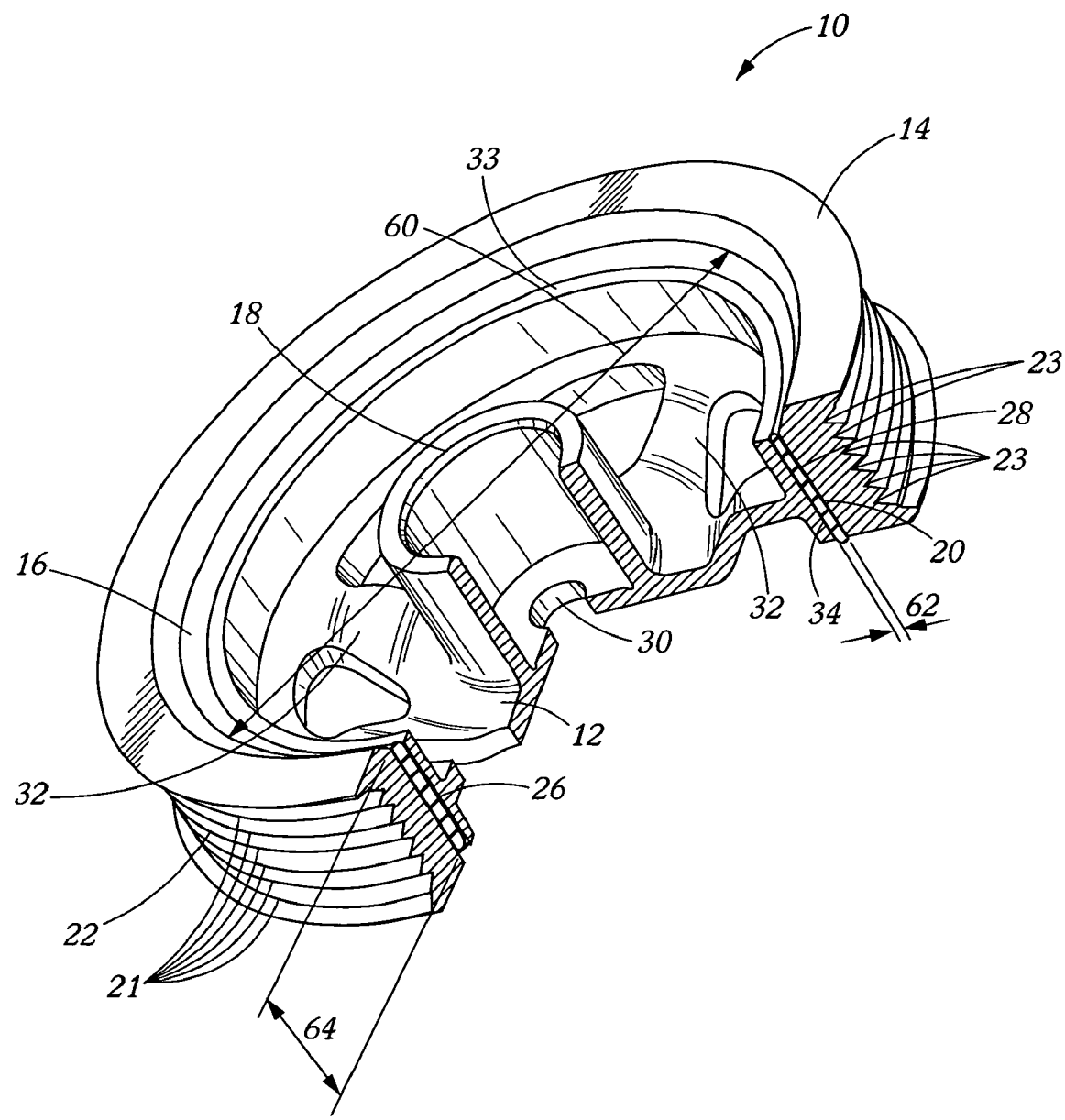
FIG. 1 is a perspective, partial cut-away view of a crankshaft torsional vibration damper made in accordance with an embodiment of the present invention.

Referring to FIG. 1, a crankshaft torsional vibration damper 10 constructed in accordance with an embodiment of the present invention is shown generally. The damper 10 comprises an annular metal hub 12 as shown, coaxially disposed within an inertia member, depicted in FIG. 1 as a metal pulley 14. An annular rubber member 16 comprising an outer surface 28 and an inner surface 34, an outside diameter 60, a thickness 62 and an axial width 64, is disposed, optionally under compression in the range of up to about 50% between the hub 12 and pulley 14, and provides damping and/or vibration isolation characteristics to the assembly as is well known in the art. In the present context, the terms "inner" and "outer" are not used to describe specific, absolute locations, but rather are used to convey the general spatial relationship between the described parts.

The hub 12 comprises an outer surface 26 in adhering contact with the rubber member's inner surface 34, and furthermore includes a central transverse elongate tube 18 for receiving a mounting axle (not shown, but conventional) and having an aperture 30 for receiving a mounting bolt or support (not shown, but conventional) within an automotive accessory drive system. In the embodiment shown, integral connecting members or arms 32 extend generally from the tube 18 toward the outer periphery 33 of the hub 12, to connect the tube 18 to the balance of the hub body. Alternatively, but less preferably due to the added expense and weight of such configuration, the hub 12 could comprise an essentially solid disc containing a central aperture for supporting the hub within the drive assembly, or any other suitable configuration whereby the hub's mounting point, illustrated in FIG. 1 as the elongate tube 18, is sufficiently engaged with or connected to its rubber member contact point 26.

Figure 5:
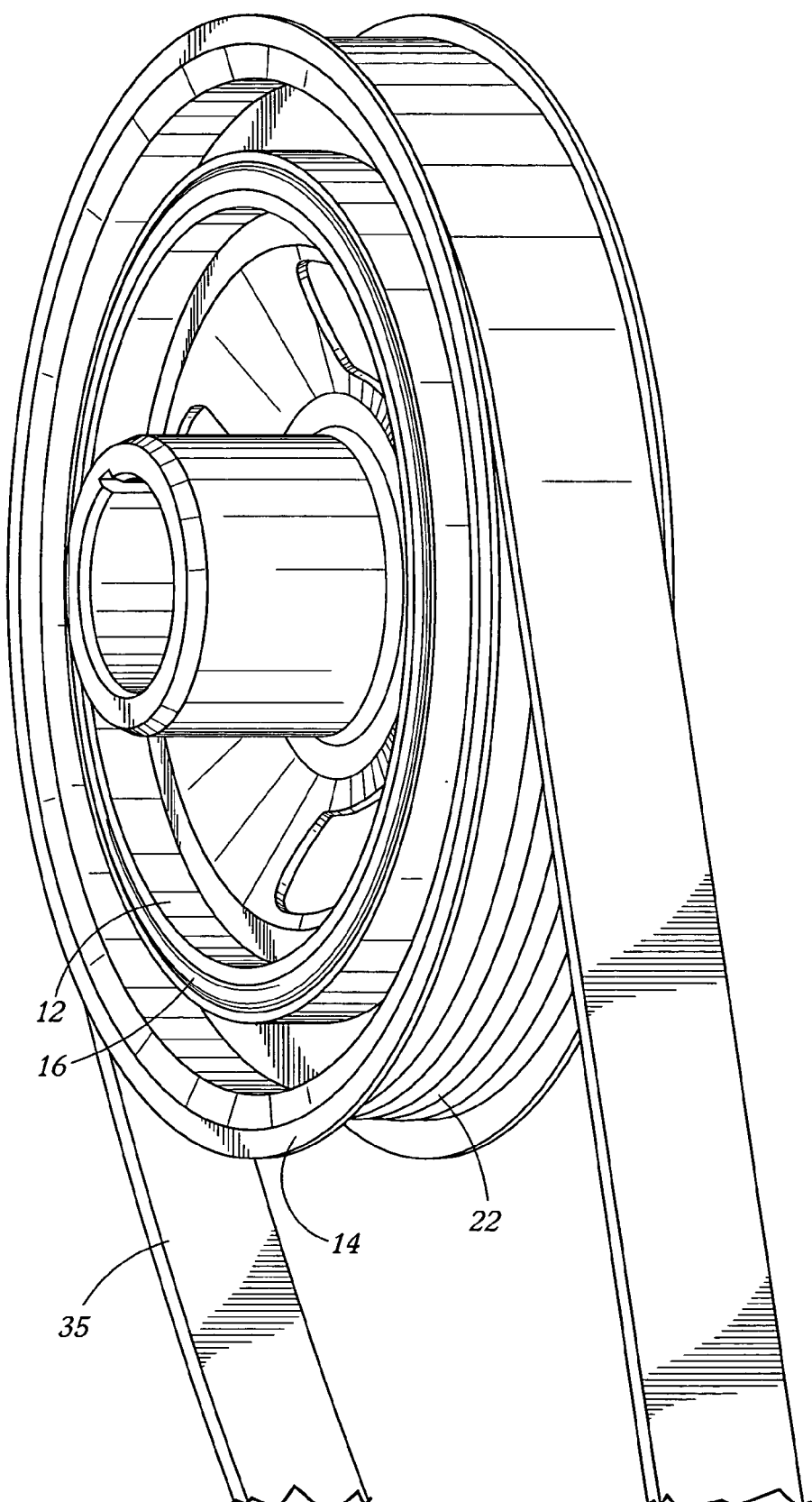
FIG. 5 is a perspective partial view of a crankshaft torsional vibration damper as described above for FIG. 2 in combination with a drive belt as part of an accessory drive assembly.

In the embodiment shown, the pulley 14 includes an inner surface 20 in adhering contact with the outer surface 28 of the rubber member 16, and an opposite, drive-member engaging surface 22 characterized in the illustrated embodiment by an alternating arrangement of projections 21 and depressions 23 forming grooves as shown for receiving and providing driving engagement with a suitably-configured drive member, e.g., a multi-v-ribbed belt 35 as shown in FIG. 5, as part of an automotive accessory drive assembly.

As the hub 12 and pulley 14, any suitable and/or conventional material may be employed, including plastics, rubbers and metals, such as steel including galvanized, phosphated and stainless varieties, cast iron, brass, zinc or aluminum, but which is preferably a metal such as iron or steel, and may moreover contain alloy metals, e.g., chromium and nickel, tungsten, molybdenum, manganese, vanadium, chromium, cobalt and zirconium, in conventional amounts, e.g. of from 0 to about 25%. These components may be formed by any conventional and/or suitable method, such as by machining, spinning or by otherwise forming suitable configurations. In an embodiment associated with the description set forth below for FIG. 1, both the hub 12 and the pulley 14 are formed of spun steel. For other applications one may prefer that the pulley 14 be formed of machined cast iron.

As the rubber member, any suitable and/or conventional cured elastomer composition may be employed, which may be selected by the skilled practitioner to exhibit suitable strength, flexibility, flex fatigue resistance, compression set, damping and/or isolation characteristics, etc., for a given application. The materials for utilization as the rubber member 16 in accordance with exemplary embodiments of the present invention are described in further detail below.

Figure 2:
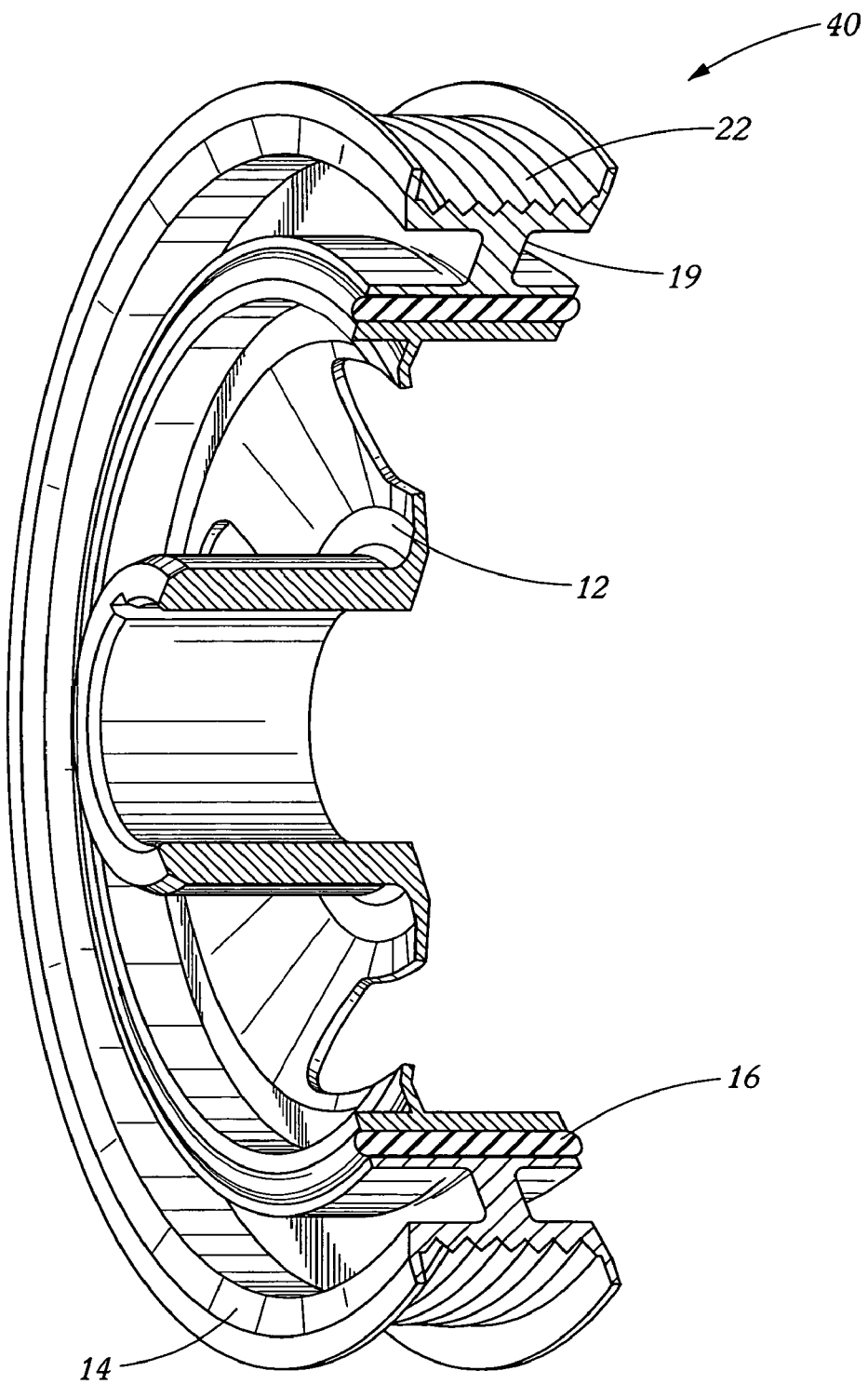
FIG. 2 is a perspective, partial cut-away view of a crankshaft torsional vibration damper made in accordance with another embodiment of the present invention.

Referring to FIG. 2, a second type of crankshaft torsional vibration damper 40 is shown. The damper 40 includes a hub 12, a pulley 14 and a rubber member 16 as set forth above in the description provided for FIG. 1, but in this embodiment, the pulley drive member-engaging surface 22 possesses an alternative configuration characterized by a separation of such surface 22 from that surface of the pulley in contact with the rubber member 16, with connection of the surface 22 to the balance of the pulley 14 by a transverse connecting member 19 perpendicular to the drive member engaging surface 22.

Figure 3:
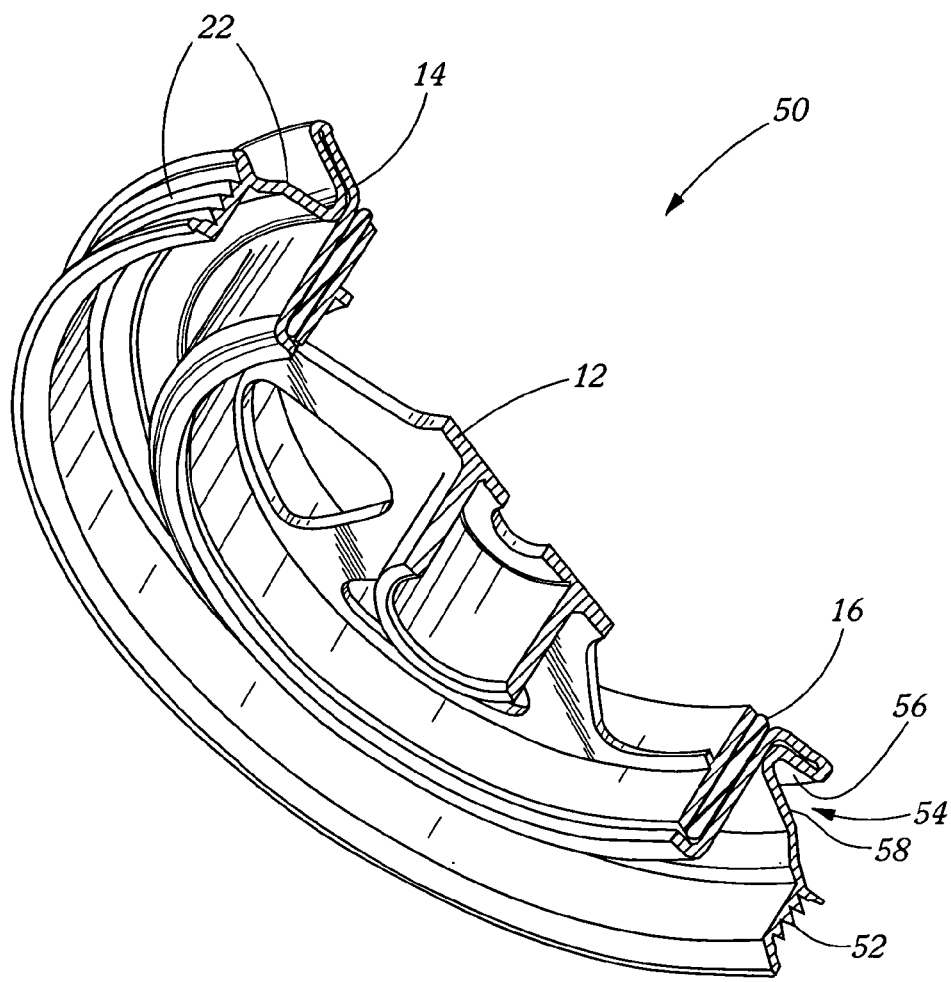
FIG. 3 is a perspective, partial cut-away view of a crankshaft torsional vibration damper made in accordance with another embodiment of the present invention.

Referring to FIG. 3, a third type of crankshaft torsional vibration damper 50 is shown generally. The damper 50 includes a hub 12, a pulley 14 and a rubber member 16 as set forth above in the description provided for FIG. 1. In this embodiment however, the pulley's drive member-engaging surface 22 possesses yet another alternative configuration characterized by a first belt-engaging surface 52 having a grooved profile as described above for FIG. 1, and an integral second belt engaging surface 54, set at a radius less than that of the first belt-engaging surface 52 as shown, and possessing a V-shaped cross-sectional profile formed by a pair of outwardly extending surfaces 56, 58, for driving engagement with the driving surfaces of a V-belt of suitable dimensions. The skilled practitioner would readily recognize that the relevant pulley surface could equally well exhibit two grooved belt engagement surfaces for engagement with two multi-v-ribbed belts; two V-shaped belt engagement surfaces for engagement with two V-belts, or any other combination or configuration appropriate for the particular drive contemplated. In each case, the invention described herein, which is related to the fixation of the rubber member 16 between the hub 12 and the pulley 14 at the pulley surface remote from the drive member-engaging surface(s), would provide substantially the same benefits. The alternative configurations set forth herein are merely illustrative of several damper configurations which may be appropriate for one particular drive or another, and are not meant to limit the scope of the present invention as set forth in the appended claims.

In addition, while each of the crankshaft torsional vibration dampers illustrated in the several figures include flat rubber-to-metal interfaces, as indicated in FIG. 1 for example in the relationship between pulley inner surface 20 and rubber member outer surface 28, it will be readily recognized that any suitable alternative configuration may be employed as appropriate for a given application. For example, the rubber member itself and one or both of the relevant hub and pulley surfaces to which the rubber member is chemically bonded according to the present invention may include one or more curvatures or projections. This technique could be used for example to reduce crankshaft bending vibration, or to contribute a mechanical component to the chemical bond produced through the practice of the present vibration. An example of curvatures of the type that may contribute one or more such characteristics is set forth in U.S. Pat. No. 5,231,893.

Moreover, while the exemplary figures set forth herein illustrate various crankshaft torsional vibration dampers, the subject invention is not intended to be limited to such parts, but is instead applicable to any bonded part wherein a rubber member is bonded to at least a second substrate, such as rubber-to-metal bonded part, including for example rubber-viscous vibration isolation dampers and other types of torsional vibration dampers including dual-mode torsional vibration dampers, camshaft torsional vibration dampers, driveshaft torsional vibration dampers; shaft dampers, shock cells, vibration isolators, vibration isolation mounts, vibration dampers, couplings, suspension bushings, transmission- and axle seals, tires, belts, hose and rolls. Examples of such articles are described in U.S. Pat. No. 4,477,302 to Leblanc et al., U.S. Pat. No. 5,231,893 to Sisco et al., U.S. Pat. No. 4,368,807 to McLean, U.S. Pat. Nos. 4,223,565, 5,660,256, and 5,575,869 to Fujiwara et al. Non-limiting examples of belt constructions and processes therefore are disclosed in U.S. Pat. Nos. 2,507,852, 3,078,206, 3,138,962, 3,250,653, 3,772,929, 4,066,732, 4,330,287 and 4,332,576. Non-limiting examples of hose constructions and processes therefore are described in U.S. Pat. Nos. 3,994,761 and 4,000,759 to Higbee. In each instance, it is anticipated that the subject invention would provide a very high degree of chemical bonding of the rubber component to the associated metal or other second surface, optionally in the absence of a separate rubber-to-metal adhesive applied at the rubber-to-metal interface. Moreover, while the description provided above in relation to the figures is directed to rubber-to-metal bonded parts, the subject invention may likewise be used in the construction of bonded parts wherein the second substrate to which the rubber member is bonded is formed of a material other than metal. Such materials may include for example, plastic; rubber, including uncured, cured or partially cured rubber; or thermoplastic elastomer.

Turning now to a description of the materials for utilization in forming the rubber member 16 in the practice of an embodiment of the present invention, any suitable elastomer composition may be employed, which comprises at least one elastomer, at least one curative, and at least one adhesive adjuvant or coagent such as a rubber-to-metal adhesive adjuvant or coagent. Within the present context, the terms, "elastomer" and "rubber" will be utilized interchangeably to denote any natural or synthetic high polymer having the properties of deformation and elastic recovery upon curing or vulcanization; and the terms "curative", "curing agent", "cross-linking agent" or "vulcanization agent" will be utilized interchangeably to denote a substance that is capable of converting an elastomer from thermoplastic to thermosetting, i.e., that is capable of cross-linking the elastomer molecules. In the present context, the terms, "rubber-to-metal adhesive adjuvant" (or "adjuvant") and "rubber-to-metal adhesive coagent" (or "coagent") are used interchangeably to denote a material that provides, promotes or contributes to adhesion between itself and one or more other materials, or between two or more such materials, through mechanical- and/or chemical bonding, the latter of which may include any type, including but not limited to covalent bonding, ionic bonding, dipole interactions such as hydrogen bonding, etc.

Suitable elastomers that may be utilized for this purpose include for example ethylene-alpha-olefin elastomers (such as ethylene propylene copolymers (EPM), ethylene propylene diene terpolymers (EPDM), ethylene octene copolymers (EOM), ethylene butene copolymers (EBM), ethylene octene terpolymers (EODM); and ethylene butene terpolymers (EBDM)); ethylene/acrylic elastomer (EAM), polychloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin (ECO), polybutadiene rubber (BR), natural rubber (including synthetic polyisoprene)

(NR), chlorinated polyethylene (CPE), brominated polymethylstyrene-butene copolymers, styrene-butadiene-styrene (S-B-S) and styrene-ethylene-butadiene-styrene (S-E-B-S) block copolymers, acrylic rubber (ACM), ethylene vinyl acetate elastomer (EVM), and silicone rubber, or a combination of any two or more of the foregoing. In an embodiment of the present invention the elastomer is an ethylene-alpha-olefin elastomer such as EPDM.

Within the present context, the terms "bonded" and "adhered" unless specifically noted otherwise, are used interchangeably as well recognized in the art, to denote a strong or substantial fixation brought about by chemical reaction. This condition is characterized by any increased force required to separate the relevant substrates compared to that force required to separate the substrates in the absence of such condition. Bonding strength may exceed rubber tear strength in the practice of the present invention, resulting in cohesive failure of the rubber, but cohesive failure is not necessary to establish that some bonding is achieved within the context of the present invention.

In the practice of an embodiment of the present invention, it has been found that elastomer composition properties such as elastomer crystallinity, damping capability and viscosity or modulus have virtually no appreciable impact on the level of adhesion achieved between the relevant rubber and metal surfaces. The skilled practitioner will recognize however that one or more such properties may be controlled or selected to influence the overall performance or capability of, e.g., a crankshaft torsional vibration damper constructed in accordance with an embodiment of the present invention, as desired for a given application. Thus, while not necessary in the practice of the present invention, ethylene-alpha-olefin elastomers having an ethylene content in the range of from about 40 to about 80% by weight; more preferably of from about 50 to about 75% by weight; and most preferably of from about 50 to about 62% by weight have favorably been employed as the base elastomer in accordance with an embodiment of the present invention. A Mooney viscosity of such elastomer, of from about 10 to about 100 at 125° C., more preferably of from about 20 to about 75 at 125° C. and most preferably of from about 50 to about 75 at 125° C. has moreover been found to achieve good results in accordance with an embodiment of the present invention.

EPDM materials that may for example be used in the practice of embodiments of the present invention include those available under the references KELTAN by DSM Chemical Co.; silicone-modified EPDM or EPDM/silicone rubber blends including those available under the reference ROYALTHERM by Uniroyal Chemical Co., and those EPDM materials available under the references VISTALON by Exxon, NORDEL by DuPont-Dow Elastomers, and ROYALENE by Uniroyal Chemical Co.

In accordance with the present invention, the composition furthermore preferably includes at least one adhesive adjuvant, and in an embodiment of the present invention, includes at least one rubber-to-metal adhesive adjuvant, for providing improved adhesion of the rubber member to the metal components upon vulcanization thereof in accordance with an embodiment of the present invention described in further detail below. Suitable adjuvants include those materials generally classified as Type I coagent compounds, exemplified by polar, relatively low molecular weight materials such as acrylates, methacrylates and certain bismaleimides; and those materials generally classified as Type II coagent compounds, exemplified by the low polarity, network-building maleated polybutadienes. Further examples, characteristics and suitable usage amounts of Type I and Type II coagents are described in the paper, "1,2 Polybutadiene Coagents for Improved Elastomer Properties" by R. E. Drake et al., Ricon Resins, Inc., as presented at the American Chemical Society Rubber Division Meeting in November 1992. Type I and Type II coagents are furthermore disclosed in U.S. Pat. No. 5,300,569 to Drake et al., and as polyfunctional monomers in U.S. Pat. No. 4,857,571, the disclosures of which with respect to exemplary coagents and their relative useful amounts in elastomer compositions are hereby specifically incorporated by reference.

In combination with the ethylene-alpha-olefin elastomers utilized in exemplary embodiments of the present invention, such Type II adjuvants include for example maleated polybutadienes, such as maleinized 1,2-polybutadiene resins (70-90%) exemplified by the material available under the trademark RICOBOND 1756 by Ricon Resins; and the Type I metal salts of alpha-beta unsaturated organic acids set forth for example in U.S. Pat. No. 5,610,271 to Yarnell et al., the contents of which with regard to such salts and their beneficial use in such elastomer systems is herein specifically incorporated by reference. Such salts include zinc diacrylate and zinc dimethacrylate including those available under the trademarks SARET 633, SARET 634 and SARET 708 by The Sartomer Co. In particular, zinc dimethacrylate may beneficially be utilized in amounts of from about 1 to about 50 parts per hundred weight of elastomer ("phr"), more preferably of from about 10 to about 40 phr, and most preferably of from about 15 to about 30 phr. Maleated polybutadiene resins when used may be favorably incorporated in the elastomer compositions in the same to slightly lower amounts, e.g., of from about 1 to 50 phr; more preferably of from about 5 to 40 phr; and most preferably of from about 10 to 30 phr. Additionally, imide coagents such as that exemplified by N,N'-m-phenylenedimaleimide available under the trademark HVA-2 by DuPont Chemical Co. may be used singly in about the same foregoing amounts, or may optionally but favorably be used in combination with one or more of the above-described adjuvants/coagents, in amounts of from about 0.25 to about 5 phr; more preferably of from about 0.50 to about 2.5 phr; and most preferably of from about 0.75 to about 1.50 phr.

It is believed that those materials conventionally classified as tackifiers may moreover be utilized singly or in combinations of two or more thereof as adhesive adjuvants, and have furthermore been used in combination with one or more of the foregoing Type I and/or Type II coagents in the practice of the present invention. Such materials may include for example terpene resins, terpene-phenol resins, rosins, aromatic hydrocarbon tackifiers, polyterpene resins, hydrocarbon resins, and preferably those available under the references WINGTACK from Goodyear and RESINEX from Harwick. These materials when employed in the practice of the present invention may be utilized in amounts of from about 1 to about 100 phr, more preferably from about 10 to about 75 phr, and most preferably of from about 20 to about 60 phr.

For utilization in an embodiment of the present invention, the elastomer composition optionally but preferably includes one or more additional conventional rubber composition additives, e.g., fillers, oils, vulcanization agents, activators and accelerators; scorch retarders, tackifiers, processing aids etc., in amounts conventionally employed, to form elastomeric materials useful in the practice of the present invention. For example, suitable fillers may be reinforcing, non-reinforcing, semi-reinforcing types or combinations of the foregoing, and may include carbon blacks; silica; clay; talc, etc. In particular, such fillers may be employed in the practice of the present invention in amounts of from about 0 to about 200 phr; more preferably of from about 10 to about 150 phr, and most preferably of from about 25 to 100 phr. In those applications wherein static conductivity is desirable, such as in the construction of various vibration dampers, the incorporation of a suitable conductive black may be particularly useful.

The elastomer compositions according to an embodiment of the present invention may be cured using any suitable and/or conventional curative or vulcanization system suitable for use with the base elastomer, including those employing sulfur, organic peroxide or other free-radical inducing material, and combinations of two or more thereof, in cure-effective amounts. In an embodiment the elastomer composition is cured in at least two stages, through a cure-effective amount of a curative selected from organic peroxides, organic peroxides blended with from about 0.01 to about 1.0 phr of sulfur, ionizing radiation, and combinations of two or more of the foregoing. For utilization with the ethylene-alpha-olefin elastomers of an embodiment of the invention, peroxide curatives are preferred, being present in the elastomer composition at levels of from about 0.5 to 25 phr; more preferably of from 1 to 20 phr; and most preferably of from about 2 to about 15 phr.

In an embodiment of the present invention, at least two separate curatives or cure systems (i.e., wherein the cure system may include a single curative or blends or mixtures of two or more individual curatives), are employed to cure the elastomer composition. Such curatives may moreover be advantageously selected such that each such curative or cure system possesses an activation temperature range distinct from the other. In a further embodiment, two such curatives are employed in the elastomer compositions of the present invention, activation of each of which being triggered by exposure to a set of conditions, including temperature, pressure and exposure period, different from the other. For substantially equal exposure periods and pressures, activation temperatures of such two curatives according to an embodiment at least five (5) degrees Centigrade apart from one another; more preferably at least fifteen (15) degrees Centigrade apart from one another; and most preferably at least twenty five (25) degrees Centigrade apart from one another may be beneficially employed. This aspect of this embodiment of the invention is further described in the Illustrations below. Exemplary materials exhibiting respective activation temperatures beneficial in the practice of the present invention include as the first curative, 1,1-Di-(t-butylperoxy)-3,3,5-trimethylcyclohexane such as that available under the trademark VAROX 231XL by R.T. Vanderbilt; and as the second curative, 2,5-dimethyl-2,5-Di-(t-butylperoxy) 3-hexyne such as that available under the trademark VAROX 130XL by R.T. Vanderbilt.

According to an embodiment of the present invention, this first curative may favorably be incorporated in the elastomer compositions according to this embodiment, in amounts of from about 0.2 to about 20 phr; more preferably of from about 0.3 to about 15 phr, and most preferably of from about 0.4 to about 10 phr. According to this same embodiment, this second curative may be incorporated in the elastomer compositions in amounts of from about 0.05 phr to about 25 phr; more preferably of from about 0.1 to about 20 phr; and most preferably of from about 0.2 to about 15 phr. Suitable ratios of first to second curatives within the elastomer compositions according to this embodiment of the invention may be from about 1:20 to about 30:1; more preferably of from about 1:12 to about 20:1; and are most preferably from about 1:7 to about 10:1.

Elastomer composition properties such as post-first-step cure modulus, adhesion level and tear strength have been found to vary with both the ratio of the first curative to the second curative, as well as the total amount of each curative present in the elastomer composition. Those skilled in the relevant art would readily appreciate the various permutations that can be achieved, with both positive and negative impact on the resultant properties of the cured elastomer composition, through varying these individual curative ratios and amounts as indicated in the illustrations set forth below, and would be able to tailor the specific ratios and amounts of curatives within the scope of the present invention as appropriate for a given application.

As indicated above, further conventional rubber additives may be employed in forming the elastomer compositions useful in the practice of the present invention, e.g., process aids such as zinc stearate may be utilized as desired in conventional amounts, e.g., up to about 5 phr. Plasticizers and/or extender oils or other processing aids may optionally be utilized in any suitable amount, e.g., up to about 300 phr and more preferably of from about 20 to about 100 phr; vulcanization accelerators and/or retarders may optionally be employed in any suitable amount, e.g. up to about 10 phr; and antioxidant systems may optionally be employed in any suitable amount, e.g. up to about 5 phr may optionally be utilized.

In an embodiment of the invention wherein the elastomer utilized in the elastomer composition is an ethylene-alpha-olefin elastomer, e.g., EPDM, having a relatively high molecular weight and/or narrow molecular weight distribution, the elastomer composition optionally further comprises a suitable paraffinic or naphthenic oil as a processing aid, with paraffinic oils being more preferred for utilization with such elastomers. Such oils may optionally be utilized in amounts up to about 300 phr; or from about 10 to about 250 phr; or at from about 50 to about 150 phr, to decrease compound viscosity as needed to achieve proper mixing of composition constituents or to adjust the compound hardness or to simply reduce the compound cost. Suitable paraffinic oils include for example those available under the references SUNPAR by Sun Refining Co.; and SHELL-FLEX by Shell Chemical Co. Moreover, paraffinic oil or some portion thereof may be provided through addition of the particular elastomer employed. For example, the EPDM elastomer available under the trademark KELTAN K7441A by DSM is believed to include 75 phr of paraffinic oil per 100 phr of polymer (and for this reason, is included in formulations set forth in Tables 1 and 2 below, at 175 phr, i.e., 100 phr constituting the elastomer portion and the remainder constituting the oil).

According to one embodiment thereof, the present invention provides a process for bonding rubber to metal which avoids the drawbacks of prior art processes, and includes the steps of placing an uncured elastomer composition comprising at least a base elastomer, at least one rubber-to-metal adhesive adjuvant and at least one curative as described above into a shape-forming mold, of the type utilized in any suitable and/or conventional press molding process, e.g., injection molding, transfer molding and compression molding; and applying sufficient temperature over a sufficient period of time at a sufficient pressure to substantially, but not fully cure the elastomeric material; placing the so formed rubber member in contact with at least one metal substrate surface and applying sufficient temperature over a sufficient period of time to substantially fully cure the rubber member. Through this process, sufficient adhesion is achieved between the rubber member so formed and the metal substrate in the absence of rubber-to-metal adhesives applied directly at the rubber-metal interface such that one may avoid utilization of such potentially harmful and/or costly metal adhesives in such process, without relying entirely on any compression and frictional forces that may be present to hold the rubber member in place. It has been surprisingly found that by following the steps of this process in accordance with the description set forth herein, robust strength of adhesion is achieved, sufficient to allow for utilization of this process in high vibration and/or shock applications exemplified by automotive crankshaft torsional vibration dampers as illustrated in the figures described above. This phenomenon is described more fully below in the accompanying Illustrations.

In an embodiment of the present invention particularly useful in the manufacture of metal-rubber composite structures exemplified by torsional vibration dampers, wherein the rubber member is disposed, optionally under compression, between two or more outer metal surfaces, the process preferably includes the steps of curing the elastomer composition in at least two steps, wherein in the first curing step, preferably performed with the uncured elastomer in a shape-forming mold, the elastomer is less than fully cured; and in the second curing step, preferably performed with the less-than-fully cured elastomer composition in contact with the relevant metal surface, the elastomer is at least substantially fully cured. The level of adhesion obtained in bonding rubber to metal using the two step curing process of an embodiment of the present invention has been found to generally be at a level of from about 10% to about 100% of that level of adhesion achieved through one-step vulcanization bonding for identical or substantially comparable compositions, depending primarily on the level of metal adhesive coagent used.

Two stage curing in accordance with an embodiment of the subject invention however, has been found to provide improved durability of the associated rubber member compared to comparable parts assembled utilizing vulcanization bonding techniques. The skilled practitioner would readily recognize that in vulcanization bonding uncured elastomer compositions directly to metal, at least some rubber shrinkage occurs almost immediately upon allowing the material's temperature to fall below its characteristically high vulcanization temperature. In the assembly of rubber-to-metal bonded parts exemplified by crankshaft torsional vibration dampers wherein the rubber member is disposed between two outer metal surfaces, as the vulcanized assembly is brought to room temperature following vulcanization, the so-affected rubber member exhibits some level of shrinkage and thus is stretched between the metal surfaces to which it is bonded. This results in the rubber residing under tension between the metal surfaces. This tension leads to crack propagation and associated defects and ultimately to premature failure. The flexing to which the damper or comparable assembly would likely be exposed in operation would furthermore generally exacerbate this problem.

The two-stage vulcanization process of an embodiment of the present invention avoids such difficulties. In particular, by exposing the elastomeric composition to an initial partial curing operation prior to its application to at least one of the associated metal surfaces, any shrinkage that may occur during vulcanization at this stage can be accommodated through an appropriate modification or selection of mold dimensions. Subsequently, when the partially cured molded elastomer composition is disposed under compression between both of the associated metal surfaces, an additional curing operation can be performed, sufficient to fully cure the elastomer and to bond it to the metal without causing the elastomer to go into a state of tension.

One of ordinary skill in the relevant art would readily appreciate that in addition to the specific examples set forth herein, a number of process steps or configurations would lend themselves equally well to the method of the present invention in various embodiments thereof. Thus for example, for those bonded parts comprising a rubber member bonded to at least two outer members, the first, partial curing step could be performed with the uncured elastomer composition in contact with a surface of at least a first such outer member such that the rubber member is vulcanization bonded to such outer member surface, and the second curing step could be performed with the partially cured elastomer composition in contact with a surface of a second such outer member. Such variations are contemplated within the scope of the present invention, which is limited only by the appended claims.

As indicated above, one advantage of conventional post-vulcanization bonding techniques is that since the rubber member is fully cured prior to its placement between the outer metal surfaces, it does not exhibit significant shrinkage. Variables such as the compression set of the elastomer, and the level of compression applied to the rubber between the metal may be controlled in such a manner to achieve a composition that is in a neutral state at a given temperature, above which it generally resides under compression. In the practice of the present invention, it has surprisingly been found that by partially curing the elastomeric composition in a molding operation as described herein to a state of cure of at least about 20%, preferably of from about 30% to about 99%, and preferably of from about 50% to about 95%, as determined in accordance with ASTM D5289 and utilizing Monsanto moving die Rheometer techniques and apparatus, a second curing operation can subsequently be performed, preferably with the elastomeric composition in contact with the relevant metal surface(s), and under an applied force sufficient to achieve rubber compression of from about 1% to 60%, or from about 5% to about 50%, or from about 10% to about 40%, to fully cure the composition, to provide robust strength of adhesion of the fully vulcanized rubber member in the absence of additional adhesive compositions at the rubber-to-metal interface, and to maintain the rubber member in essentially a neutral, i.e., non-tensioned state at its intended operating temperature range, of, e.g., −20° C. to about 120° C. At relatively lower states of cure accomplished in the first cure step, relatively higher levels of adhesion may be established, which may be desirable for those applications wherein rubber compression (or preventing the rubber from going into tension at its expected operating temperature) is not needed.

Illustrations and Examples

In the following Illustrations and Examples:

Keltan 7441A denotes EPDM available under that reference by DSM.

Keltan 55 denotes EPDM available under that reference by DSM.

Keltan 2340A denotes EPDM available under that reference by DSM.

Royaltherm 1411 denotes silica-modified EPDM/silicone blend available under that reference by Uniroyal Chemical Co.

Royalene 580 HT denotes EPDM available under that reference by Uniroyal Chemical.

Exxon Butyl 268 denotes isobutylene-isoprene elastomer available under that reference from Exxon Chemical Americas (or R. T. Vanderbilt).

Vistanex MM L-140 denotes Polyisobutylene available under that reference from Exxon Chemical Americas.

Vamac D denotes ethylene/acrylic elastomer available under that reference from DuPont Chemical Co.

Hypalon 40 S denotes chlorosulfonated polyethylene available under that reference from DuPont Chemical Co.

Tyrin CM denotes denoted chlorinated polyethylene available under that reference from DuPont Dow Chemical Co.

Kraton G1652 denotes S-EB-S block copolymer blends available under that reference from Shell Chemical.

Kraton D1112P denotes S-B-S block copolymer blends available under that reference from Shell Chemical.

Kraton D1107 denotes S-B-S block copolymer blends available under that reference from Shell Chemical.

Trilene 65 DLCA denotes 72% base on silicate powder peroxide or sulfur cure available from Natrochem.

N550 denotes carbon black N550.

N472 denotes conductive carbon black N472 under the reference STERLING XC-72 by Cabot.

N293 denotes conductive carbon black type N293 under the reference STERLING C by Cabot.

HiSil 233 denotes precipitated, hydrated amorphous silica available from PPG.

Maglite D denotes magnesium oxide available under that reference by CP Hall.

Franklin T-14 denotes calcium carbonate from Franklin Industries.

Dixie 2.6 denotes clay from R.T. Vanderbilt.

Mistron Vapor Compac denotes magnesium silicate (talc) available under that reference from Luzenac America, Inc.

McNamee Clay denotes Kaolin (soft) clay (hydrated aluminum silicate) available under that reference from R.T. Vanderbilt.

HVA-2 denotes N,N'-m-phenylenedimaleimide (imide coagent) available under that reference by DuPont Dow Chemical Co.

SARET 633 denotes zinc diacrylate available under that reference by Sartomer Co.

SARET 634 denotes zinc dimethacrylate available under that reference by Sartomer Co.

RICOBOND 1756HS denotes maleated polybutadiene available under that reference by Ricon Resins, Inc.

CBS denotes N-cyclohexyl-2-benzothiazylsulfenamideN-t-butyl 2-benzothiazol sulfenamide (accelerator) available under that reference by Harwick.

VAROX 130XL denotes 1,1-Di-(t-butylperoxy)-3,3,5-trimethylcyclohexane available under that reference by R.T. Vanderbilt Co.

VAROX 231 XL denotes 2,5-dimethyl-2,5-Di-(t-butylperoxy) 3-hexyne available under that reference by RT Vanderbilt Co.

VULCUP 40 KE denotes 2,2' bis (tert-butylperoxy diisopropylbenzene) 40% on Burgess KE clay available under that reference by Harwick.

Harmony AW-46 denotes hydraulic oil available under that reference by Petro-Canada.

Ultima EP-220 denotes a gearbox oil available under that reference by Petro-Canada.

Dascoway 68 denotes a Waylube oil available under that reference by D.A. Stuart, Inc.

Drawsol 165 M denotes draw compound available under that reference by D.A. Stuart, Inc.

S500-US 5% denotes a coolant available under that reference by Hangsterfer's Laboratories, Inc. in a 5% concentration in water.

While any conventional or suitable procedure for mixing an elastomer composition may be employed in the practice of the present invention, for each of the following elastomer compositions numbered E1-E72, processing was carried out as follows. In each case the EPDM or modified EPDM polymer or other elastomer or combination of elastomers was first added to a 1A Banbury mixer having an inner volume of 16,027 cm$^3$ with mixing at 40 rpm (or, in the case of compositions E4-E26, in a B Banbury having an inner volume of 1573 cm$^3$, with mixing at 70 rpm). After approximately one minute, the remaining ingredients with the exception of the curatives and, where utilized, accelerators were added, and the resultant mixture was blended until a temperature of 310-315° F. (154-157° C.) was reached or for a maximum time of 8 minutes. The curatives were then added on an open two-roll mill at a mixture temperature less than 100° C., and the mixture was further mixed such that 100° C. was not exceeded. For compositions E18 through E22 of Table 2, compositions E27 through E30 of Table 3, compositions E46 through E49 of Table 7 and all of the compositions of Table 8, the order of addition was switched (exclusive of curative and accelerator addition) such that the elastomer constituent was added approximately one minute after the other powdered ingredients. Unless otherwise noted, the component amounts listed in the tables and throughout the following Illustrations for elastomer compositions, are expressed in terms of parts per hundredweight of elastomer ("phr"). Where shown in the following examples, the compositions employed as an optional constituent a paraffinic or naphthenic process oil, e.g., Sunpar 150, -2280 or Plasthall 7050, as a plasticizer and/or mixing aid. Those compositions represented in the following illustrations generally further comprised one or more process aids (such as to promote mixing and/or mill release), antioxidants and/or antiozonants of conventional types for the various elastomers employed, and in conventional amounts. Thus for example the compositions employing EPDM as the base elastomer generally further comprised as optional constituents 5 phr of zinc oxide, 1.5 phr of zinc stearate, 0.6 phr of a 99% triethanolamine and 1.5 phr of an antioxidant.

Figure 4:
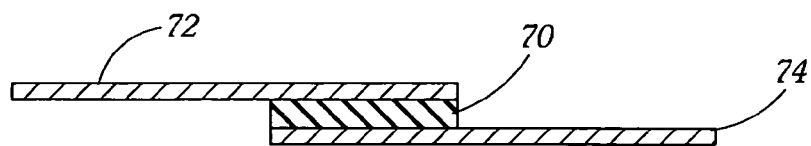
FIG. 4 is a schematic side view of a test configuration utilized in characterizing a benefit of an embodiment of the present invention.

Unless and then to the extent otherwise indicated below, Lap shear adhesion results provided in the following tables were obtained using steel tabs 72, 74 each measuring 1 inch by 2.5 inches, and molded rubber slabs 70 measuring 3/16 of an inch in thickness by 1 inch square, assembled according to the method of ASTM D816 such that the rubber sample was substantially fully covered on both relevant surfaces by the metal slab, as represented in the schematic rendering of FIG. 4, under an applied force sufficient to achieve 25% rubber compression. For the examples set forth in Tables 1 and 2, the steel slabs were grit blasted and alkali washed utilizing conventional techniques prior to the application of the elastomer composition, and a conventional assembly lubricant was applied to the surface of the elastomer compositions after the first cure step. For the remainder of the elastomer compositions, the same cleaning procedures were utilized, unless and to the limited extent otherwise noted, except that the steel slabs were not grit blasted.

Unless and if so, then to the extent otherwise specifically provided, the first step cure employed in injection- or compression molding the rubber slabs in the following Illustrations as indicated was generally performed for 4 or 5 minutes at 160° C., but in each case to achieve a partially cured elastomer composition capable of retaining the shape imparted to it in the mold. The second step cure, performed in a hot air oven (i.e., generally at atmospheric pressure) with the partially cured elastomer slabs in contact with and disposed between the steel slabs, was sufficient to provide an actual rubber temperature of 190° C. for at least 10 minutes, to essentially fully cure the elastomer composition as determined utilizing Monsanto moving die Rheometer techniques and apparatus and in accordance with ASTM 5289. The Lap Shear adhesion specimens were pulled at a rate of 0.5 inches per minute on a standard Instron™ tensile test machine to a point of adhesive or cohesive failure. The peak load so achieved is in each case reported in the Tables in pounds, or equivalently due to the above-described dimensions of the test specimens, in pounds per square inch.

In general, for the Lap Shear adhesion results reported in the following tables, adhesive failure, i.e., failure at the rubber-to-metal interface, was generally the mode of failure for all reported results up to approximately 200 lbs/in² (1.38 MPa), while for generally all reported values greater than about 200 lbs/in² (1.38 MPa), at least some level of cohesive failure, i.e., rubber tearing, occurred.

Illustration A

Exemplary effects of varying rubber-to-metal adhesive adjuvant type and level, and curative type and level, are shown in Tables 1-3. As expected, the degree of adhesion obtained is shown to generally increase with increasing amount of rubber-to-metal adhesive adjuvant in the compositions. Several examples employed a combination of two Type I coagents, namely Saret 634 plus HVA-2. E9 and E10 illustrate the use of a Type II metal adhesive coagent, i.e., Ricobond 1756HS.

The use of a single peroxide and two stage curing in accordance with an embodiment of the present invention is illustrated in Compositions E1 and E2 and E3. The use of mixed peroxide and sulfur cures in two stage curing according to an embodiment of the present invention is illustrated in Compositions E21 and E22. The remaining examples in Tables 1-3 illustrate the wide range of peroxide levels useful for two stage curing in accordance with embodiments of the present invention.

TABLE 1

| Compound Ingredients | E1 | E2 | E3 | E4 | E5 | E6 | E7 | E8 | E9 | E10 |
|---|---|---|---|---|---|---|---|---|---|---|
| Royaltherm 1411 | 100 | 100 | 0 | 0 | 0 | 0 | 0 | 0 | 0 | 0 |
| Royalene 580HT | 0 | 0 | 100 | 0 | 0 | 0 | 0 | 0 | 0 | 0 |
| Keltan 7441A | 0 | 0 | 0 | 175 | 175 | 175 | 175 | 175 | 175 | 175 |
| N472 | 0 | 0 | 40 | 47 | 47 | 47 | 47 | 47 | 47 | 47 |
| N550 | 3 | 5 | 0 | 57 | 57 | 57 | 57 | 57 | 57 | 57 |
| HiSil 233 | 6 | 10 | 0 | 0 | 0 | 0 | 0 | 0 | 0 | 0 |
| Sunpar 2280 | 0 | 0 | 60 | 60 | 60 | 60 | 60 | 60 | 60 | 60 |
| Calight RPO | 0 | 0 | 10 | 0 | 0 | 0 | 0 | 0 | 0 | 0 |
| HVA-2 | 0 | 0 | 1 | 0 | 0 | 0 | 0 | 0 | 0 | 0 |
| Saret 634 | 3 | 5 | 20 | 5 | 5 | 15 | 15 | 15 | 0 | 0 |
| Ricobond 1756HS | 0 | 0 | 0 | 0 | 0 | 0 | 0 | 0 | 15 | 15 |
| Vulcup 40KE | 3 | 3 | 3 | 0 | 0 | 0 | 0 | 0 | 0 | 0 |
| Varox 231XL | 0 | 0 | 0 | 1.88 | 0.94 | 1.88 | 3.75 | 0.94 | 3.75 | 0.94 |
| Varox 130XL | 0 | 0 | 0 | 3.22 | 3.75 | 3.22 | 2.15 | 3.75 | 2.15 | 3.75 |
| Peak Load (lbs./in²) | 83 | 62 | 141 | 37 | 44 | 103 | 92 | 44 | 74 | 71 |

TABLE 2

| Compound Ingredients | E11 | E12 | E13 | E14 | E15 | E16 | E17 | E18 | E19 | E20 | E21 | E22 |
|---|---|---|---|---|---|---|---|---|---|---|---|---|
| Keltan 55 | 100 | 100 | 100 | 100 | 100 | 100 | 100 | 0 | 0 | 0 | 100 | 100 |
| Royalene 580HT | 0 | 0 | 0 | 0 | 0 | 0 | 0 | 100 | 100 | 100 | 0 | 0 |
| N472 | 65 | 65 | 65 | 65 | 65 | 65 | 65 | 40 | 40 | 40 | 65 | 65 |
| Sunpar 2280 | 20 | 20 | 20 | 20 | 20 | 20 | 20 | 10 | 10 | 10 | 20 | 20 |
| Saret 634 | 20 | 20 | 20 | 20 | 20 | 20 | 20 | 20 | 20 | 20 | 20 | 20 |
| HVA-2 | 1 | 1 | 1 | 1 | 1 | 1 | 1 | 0 | 0 | 0 | 1 | 1 |
| Varox 231XL | 7.5 | 3.8 | 1.9 | 11.3 | 5.6 | 2.8 | 1.7 | 3.4 | 5.4 | 7 | 2.8 | 2.8 |
| Varox 130XL | 4.3 | 6.4 | 7.5 | 6.4 | 9.7 | 11.3 | 12.0 | 0.6 | 1 | 0.4 | 11.3 | 11.3 |
| Sulfur | 0 | 0 | 0 | 0 | 0 | 0 | 0 | 0 | 0 | 0 | 0.2 | 0.3 |
| CBS | 0 | 0 | 0 | 0 | 0 | 0 | 0 | 0 | 0 | 0 | 0 | 0.6 |
| Peak Load (lbs/in²) | 134 | 345 | 435 | 180 | 210 | 177 | 206 | 167 | 197 | 191 | 174 | 162 |

TABLE 3

| Compound Ingredients | E23 | E24 | E25 | E26 | E27 | E28 | E29 | E30 |
|---|---|---|---|---|---|---|---|---|
| Keltan 7441A | 175 | 175 | 175 | 175 | 175 | 175 | 175 | 175 |
| N472 | 88 | 88 | 90 | 40 | 45 | 45 | 40 | 90 |
| N550 | 0 | 0 | 0 | 80 | 30 | 30 | 80 | 0 |
| Sunpar 2280 | 20 | 20 | 50 | 60 | 30 | 30 | 60 | 15 |
| Saret 634 | 30 | 30 | 30 | 30 | 30 | 30 | 30 | 30 |
| HVA-2 | 1 | 1 | 1 | 0.5 | 1 | 0 | 1.5 | 1 |
| Varox 231XL | 2.8 | 1.8 | 1.8 | 0.9 | 1.8 | 1.8 | 5 | 5 |
| Varox 130XL | 11.3 | 7.5 | 7.5 | 9.5 | 7.5 | 7.5 | 3.2 | 0.6 |
| Peak Load (lbs./in²) | 320 | 741 | 665 | 473 | 387 | 298 | 307 | 142 |

Illustration B

Exemplary effects of varying the levels of each of two peroxide coagents, two carbon black types and paraffinic oil of respective elastomer compositions according to embodiments of the subject invention are illustrated in Table 4. In each case, uncured elastomer compositions were prepared utilizing the respective constituents set forth in the Table 4, as described above, and elastomer slabs as described above for Lap Shear adhesion analysis were formed therefrom, by compression molding individual specimens under first stage curing conditions of 4 minutes at 160° C. For each composition noted below, thus-prepared partially cured elastomer slabs were then applied under 25% compression between two steel test slabs, each having the dimensions noted above for Lap Shear adhesion analysis metal slabs. For the peak load results in Table 4 marked "WITH P80 LUBE", a thin coating of P80 lubricating oil available from International Products Corp. was applied to the relevant metal surfaces prior to application of the partially cured elastomer slabs. These assemblies to which lubricating oil were applied were each allowed to sit for 4 hours. Second stage curing for all examples was then conducted in a hot air oven to a temperature of 204° C. for 40 minutes. Lap Shear adhesion analysis in accordance with ASTM D816 was then performed both at room temperature (roughly 20° C.) and at 100° C., with a pull rate of 0.5 inches per minute, and both the peak load achieved and the percent rubber coverage upon failure were recorded. Percent rubber coverage indicates the level of cohesive versus adhesive failure that occurred for the test specimens, with zero percent rubber coverage on the steel surface indicating adhesive failure.

The adhesion results set forth in Table 4 indicate that excellent adhesion of cured elastomer slabs to steel in accordance with the present invention can be achieved utilizing a variety of conventional elastomer composition constituents at various amounts. While as indicated above the level of adhesive adjuvant in the elastomer composition has the greatest impact on the composition's level of adhesion to metal in accordance with the subject invention, it is notable that by varying, e.g., reinforcement types and/or levels, or peroxide level, one can dramatically impact the resultant strength of adhesion. This is apparent for example in the results provided for Compositions E33, E35 and E37, each of which contains 30 phr of zinc dimethacrylate adhesive adjuvant.

shown in Table 5 for the individual examples, to achieve the indicated level of cure, as determined utilizing Monsanto moving die Rheometer techniques and apparatus, according to ASTM D5289. Each of the partially cured elastomer slabs were then assembled for Lap Shear adhesion analysis as described above applying compression of 25% or 40% as indicated and utilizing the second stage cure conditions set forth in Table 5 below, cycled between −20° C. and 120° C. several times to simulate thermal stresses a damper would experience in operation, and then pulled to determine Lap Shear adhesion level as manifested in peak load, at a rate of 0.5 inches per minute on an Instron™ tester. The second step cure times and temperatures in each instance reported in Table 5 were selected to achieve in each instance a substantially fully cured composition in accordance with the procedure set forth above.

As indicated, all of the examples displayed excellent adhesion results, and moreover exhibited some level of cohesive failure, indicating that the strength of the chemical bond achieved in the practice of the present invention exceeded the tear strength of the rubber in these instances. The results indicate a maximum adhesion level at approximately 70-80% cure in the first stage, but even at 95% cure during this first stage, excellent results were obtained. Thus, the present invention permits one to partially cure the elastomer compositions in a first step performed in a shape forming mold, e.g., an injection mold, a transfer mold or a compression mold, to a point at which the material can easily be removed from the mold and can be handled and manipulated without adversely impacting the shape or integrity of the so-molded part. Thereafter, the partially cured elastomer composition molded part in an embodiment of the present invention can be inserted between or applied to the relevant metal surface(s), and then cured completely in a second step, which furthermore serves to chemically bond

TABLE 4

|  | E31 | E32 | E33 | E34 | E35 | E36 | E37 | E38 | E39 | E40 |
|---|---|---|---|---|---|---|---|---|---|---|
| Compound Ingredients |  |  |  |  |  |  |  |  |  |  |
| Keltan 7441A | 175 | 175 | 175 | 175 | 175 | 175 | 175 | 175 | 175 | 175 |
| N472 | 40 | 50 | 40 | 40 | 40 | 40 | 40 | 50 | 50 | 40 |
| N550 | 40 | 20 | 30 | 50 | 80 | 80 | 0 | 40 | 50 | 0 |
| SUNPAR 2280 | 60 | 60 | 60 | 60 | 60 | 60 | 20 | 60 | 40 | 20 |
| SARET SR-634 | 20 | 30 | 30 | 10 | 30 | 30 | 30 | 10 | 30 | 30 |
| HVA-2 | 1.5 | 0.5 | 1 | 0.5 | 1.5 | 0.5 | 1.5 | 1.5 | 1.5 | 0.5 |
| VAROX 130XL | 5.5 | 5.5 | 9.5 | 9.5 | 5.5 | 9.5 | 5.5 | 5.5 | 5.5 | 9.5 |
| VAROX 231XL | 1.8 | 2.7 | 1.8 | 2.7 | 0.9 | 0.9 | 2.7 | 0.9 | 2.7 | 0.9 |
| Adhesion results |  |  |  |  |  |  |  |  |  |  |
| Peak Load (lbs/in$^2$), 20° C., on Steel | 339 | 394 | 181 | 98 | 665 | 635 | 130 | 489 | 213 | 126 |
| % rubber coverage, 20° C., on Steel | 5 | 10 | 5 | 0 | 5 | 20 | 1 | 5 | 0 | 0 |
| Peak Load (lbs/in$^2$), 100° C., on Steel | 108 | 105 | 103 | 23 | 508 | 435 | 62 | 174 | 93 | 65 |
| % rubber coverage, 100° C., on Steel | 5 | 10 | 10 | 0 | 95 | 50 | 5 | 10 | 1 | 5 |
| Peak load (lbs/in$^2$), 20° C., on Steel WITH P80 LUBE | 231 | 70 | 12 | 0 | 424 | 473 | 181 | 88 | 339 | 247 |
| % rubber coverage, 20° C., on Steel WITH P80 LUBE | 5 | 1 | 0 | 0 | 90 | 90 | 35 | 0 | 13 | 5 |

Illustration C

The effects of varying the state of cure achieved in a first cure step are shown in Table 5. In each case, the elastomer slabs were formed by injection molding with a cure of 2 minutes at 165° C. This first cure step was then extended as the elastomer composition to the metal surface(s) in the absence of any additional adhesive applied at the relevant rubber-to-metal interface. Thus, the step of applying a rubber-to-metal adhesive at the rubber-to-metal interface can be avoided, and production efficiency and flexibility can be greatly improved. In addition, in those constructions wherein the rubber member's tendency to go into a state of tension between outer metal surfaces is undesirable, e.g., in crankshaft torsional vibration dampers as described above in relation to the accompanying drawings, the present invention in an embodiment thereof makes it possible to retain at least some level of rubber compression or neutrality within the intended operating temperature range.

TABLE 5

| Composition | E24 | E24 | E24 | E25 |
|---|---|---|---|---|
| Second step cure Temperature | 200° C. | 180° C. | 160° C. | 160° C. |
| Second step Cure Time | 19 min. | 36 min. | 155 min. | 155 min. |
| Applied Compression | 25% | 25% | 40% | 40% |
|  | Peak Load (lbs/in²) | Peak Load (lbs/in²) | Peak Load (lbs/in²) | Peak Load (lbs/in²) |
| First step cure to 50% completion | 431 | 600 | 703 | 603 |
| First step cure to 60% completion | 778 | 514 | 696 | 648 |
| First step cure to 70% completion | 481 | 504 | 739 | 642 |
| First step cure to 80% completion | 597 | 860 | 746 | 580 |
| First step cure to 90% completion | 547 | 562 | 733 | 462 |
| First step cure to 95% completion | 549 | 517 | 700 | 442 |

Illustration D

To illustrate the effectiveness of the method of an embodiment of the present invention over a broad cure temperature range, the effect on rubber-to-metal adhesion level of varying the second stage cure step conditions in order in each case to achieve a substantially cured elastomer composition is illustrated in Table 6. In each case, the elastomer compositions were mixed in accordance with the description provided above, and uncured elastomer specimens were then injection molded with a first stage cure of 2 minutes at 165° C. to form partially cured elastomer slab specimens. These partially cured specimens were then assembled into Lap Shear analysis specimens as described above, under 25% compression, and utilizing P80 assembly lubricating oil available from International Products Corp. applied in a thin layer to the steel slab surfaces. In each case, the lap shear specimens were allowed to sit for 4 hours in contact with the lubricating oil-coated slabs, and then cured as indicated in Table 6, and subsequently pulled according to the Lap Shear adhesion analysis procedure set forth above, at a rate of 0.5 inches per minute to a point of failure. In general, the failure mode in all instances shown in Table 6 was cohesive failure. Notably, in the last two examples of Table 6, a total of three curing stages were employed as shown. In general, the results so obtained indicate excellent adhesion values, but the best results were achieved with the lowest second stage cure temperatures and longest exposure periods.

TABLE 6

| Second Step Cure Time (min.) and Temperature (° C.) | Elastomer Composition | Peak Load (lbs./in²) |
|---|---|---|
| 40 minutes/204° C. | E24 | 564 |
| 40 minutes/204° C. | E25 | 480 |
| 40 minutes/215° C. | E24 | 654 |
| 40 minutes/215° C. | E25 | 403 |
| 60 minutes/193° C. | E24 | 774 |
| 60 minutes/193° C. | E25 | 695 |
| 170 minutes/174° C. | E24 | 1020 |
| 170 minutes/174° C. | E25 | 777 |
| 170 minutes/174° C., followed by 30 minutes/204° C. | E24 | 987 |
| 170 minutes/174° C., followed by 30 minutes/204° C. | E25 | 945 |

Illustration E

The results provided in Tables 7 and 8 illustrate examples of a wide range of single elastomers and elastomer blends that may be utilized with favorable results in the practice of the present invention according to embodiments thereof. As one skilled in the relevant art would readily appreciate, various elastomers or blends of elastomers are commonly used to impart in the vulcanized rubber various combinations of properties not readily achievable with a single elastomer, or to enhance certain properties, e.g., low temperature performance or improved damping characteristics. In general, these as well as any other suitable and/or conventional elastomers could also be used individually or in combinations of two or more thereof in the practice of the subject invention if compounded with appropriate levels of rubber-to-metal-adhesive coagents and curatives as described above. For the examples set forth in Tables 7 and 8 except examples number E61-E63, the first step cure conditions were four minutes at 160° C. followed by exposure of the partially cured elastomer to forty minutes at an applied temperature of 204° C., to achieve in each instance an elastomer temperature of about 190° C. for at least 10 minutes. For examples number E61, E62 and E63, the first step cure conditions were four minutes at 150° C., and the second step cure conditions were sixty minutes at 193° C., to substantially cure the elastomer composition as above. As noted above, the first step cure was performed in each case in the shape-forming mold with the uncured elastomer in contact with neither metal slab, and the second step cure was performed with the partially cured elastomer disposed between the metal slabs. In each case, lap shear adhesion analysis as described above was performed and the results for peak load so achieved are provided in Tables 7 and 8 below. As with the compositions set forth in earlier examples, the compositions set forth in Table 8 comprised as optional constituents the paraffinic plasticizer oils as shown, and further comprised as optional constituents up to about 5 phr of zinc oxide, up to 1.5 phr of zinc stearate and/or stearic acid, and up to 10 phr of a conventional antioxidant and/or antiozonant.

TABLE 7

|  | E41 | E42 | E43 | E44 | E45 | E46 | E47 | E48 | E49 |
|---|---|---|---|---|---|---|---|---|---|
| Keltan 7441A | 175 | 175 | 175 | 175 | 175 | 175 | 175 | 175 | 175 |
| Exxon Butyl 268 | 50 | 0 | 0 | 0 | 0 | 0 | 0 | 0 | 0 |
| Vistanex MM L-140 | 0 | 50 | 0 | 0 | 0 | 0 | 0 | 0 | 0 |
| Vamac D | 0 | 0 | 50 | 0 | 0 | 0 | 0 | 0 | 0 |
| Hypalon 40S | 0 | 0 | 0 | 50 | 0 | 0 | 0 | 0 | 0 |
| Tyrin CM | 0 | 0 | 0 | 0 | 50 | 0 | 0 | 0 | 0 |
| Kraton G1652 | 0 | 0 | 0 | 0 | 0 | 50 | 0 | 0 | 0 |
| Kraton D1112P | 0 | 0 | 0 | 0 | 0 | 0 | 50 | 0 | 0 |
| Kraton D1107 | 0 | 0 | 0 | 0 | 0 | 0 | 0 | 50 | 0 |
| Sterling XC-72 | 90 | 90 | 90 | 90 | 90 | 45 | 45 | 45 | 90 |
| N550 Black | 0 | 0 | 0 | 0 | 0 | 75 | 75 | 75 | 0 |
| Cumar LX-509 | 0 | 0 | 0 | 0 | 0 | 30 | 15 | 15 | 0 |
| Sunpar 2280 | 0 | 0 | 50 | 50 | 50 | 60 | 60 | 60 | 15 |
| Saret 634 | 30 | 30 | 30 | 30 | 30 | 30 | 30 | 30 | 30 |
| HVA-2 | 1 | 1 | 1 | 1 | 1 | 1.5 | 1.5 | 1.5 | 1 |
| Varox 231XL | 1.8 | 1.8 | 1.8 | 1.8 | 1.8 | 3 | 3 | 3 | 5.4 |
| Varox 130XL | 7.5 | 7.5 | 7.5 | 7.5 | 7.5 | 5 | 5 | 5 | 1 |
| Peak Load (lbs./in$^2$) | 380 | 212 | 437 | 618 | 479 | 336 | 346 | 332 | 440 |

TABLE 8

|  | E51 EAM | E52 EAM | E53 EVM | E55 EVM | E57 EVM/EPDM | E58 ECO/EPDM | E51 ECO | E60 ECO | E61 SBR | E62 HNBR | E63 NR |
|---|---|---|---|---|---|---|---|---|---|---|---|
| Vamac D[1] | 100 | 0 | 0 | 0 | 0 | 0 | 0 | 0 | 0 | 0 | 0 |
| Vamac HVG[2] | 0 | 100 | 0 | 0 | 0 | 0 | 0 | 0 | 0 | 0 | 0 |
| Levapren 700 HV[3] | 0 | 0 | 100 | 0 | 0 | 0 | 0 | 0 | 0 | 0 | 0 |
| Levapren 500 HV[4] | 0 | 0 | 0 | 100 | 50 | 0 | 0 | 0 | 0 | 0 | 0 |
| Hydrin 1100[5] | 0 | 0 | 0 | 0 | 0 | 0 | 100 | 50 | 0 | 0 | 0 |
| Hydrin H-55[6] | 0 | 0 | 0 | 0 | 0 | 50 | 0 | 0 | 0 | 0 | 0 |
| Royalene 580 | 0 | 0 | 0 | 0 | 50 | 50 | 0 | 50 | 0 | 0 | 0 |
| COPO 1721[7] | 0 | 0 | 0 | 0 | 0 | 0 | 0 | 0 | 137.5 | 0 | 0 |
| SMR-10[8] | 0 | 0 | 0 | 0 | 0 | 0 | 0 | 0 | 0 | 0 | 100 |
| Zetpol 2020[9] | 0 | 0 | 0 | 0 | 0 | 0 | 0 | 0 | 0 | 100 | 0 |
| N472 | 0 | 0 | 40 | 40 | 40 | 0 | 0 | 0 | 0 | 0 | 0 |
| N293 | 40 | 40 | 0 | 0 | 0 | 0 | 0 | 0 | 0 | 0 | 0 |
| N550 | 0 | 0 | 0 | 0 | 0 | 40 | 40 | 40 | 35 | 40 | 35 |
| Plasthall 7050 | 0 | 0 | 0 | 0 | 0 | 0 | 10 | 0 | 0 | 0 | 0 |
| Sunpar 150 | 0 | 0 | 10 | 10 | 10 | 0 | 0 | 0 | 0 | 0 | 0 |
| Ricobond 1756 HS | 30 | 0 | 0 | 0 | 0 | 0 | 0 | 0 | 0 | 0 | 0 |
| Saret 633 | 0 | 0 | 0 | 0 | 0 | 0 | 0 | 0 | 0 | 20 | 0 |
| Saret 634 | 0 | 15 | 30 | 30 | 30 | 20 | 20 | 20 | 20 | 0 | 25 |
| HVA-2 | 2 | 2 | 0 | 0 | 0 | 0 | 0 | 1 | 0 | 0 | 0 |
| Vul-Cup 40KE | 0 | 0 | 0 | 0 | 0 | 0 | 0 | 0 | 4 | 1.5 | 1.5 |
| Varox 231XL | 5 | 5 | 5 | 5 | 5 | 2.1 | 2.1 | 4 | 0 | 4 | 4 |
| Varox 130XL | 1 | 1 | 1 | 1 | 1 | 0.42 | 0.42 | 0.8 | 0 | 0 | 0 |
| Peak Load (lbs/in$^2$) | 162 | 463 | 418 | 391 | 376 | 317 | 376 | 254 | 77 | 78 | 84 |

[1,2]EAM available under that designation by DuPont Chemical
[3,4]EVM available under that designation by Bayer AG
[5,6]ECO under that designation by Zeon Chemical
[7]SBR available under that designation by DSM Copolymer.
[8]NR available under that designation by Akrochem
[9]HNBR available under that designation by Zeon Chemical.

Illustration F

The effects of bonding respective elastomer compositions to different types of metal, in this case, to steel and to aluminum, in accordance with an embodiment of the present invention are illustrated in Table 9. Uncured elastomer compositions were prepared utilizing the respective constituents set forth in the Table 9 as described above, and elastomer slabs as described above for Lap Shear adhesion analysis were formed therefrom by compression molding individual specimens in appropriately dimensioned compression molds under first stage curing conditions of 4 minutes at 160° C. The respective surfaces of these partially cured elastomer slabs were then wiped with isopropyl alcohol in accordance with conventional rubber preparation methods. For each composition noted below, thus-prepared elastomer slabs were then applied between two steel test slabs and also between two aluminum slabs, each having the dimensions noted above for Lap Shear adhesion analysis metal slabs, utilizing P80 lubricating oil applied to the metal surface, and under an applied force resulting in 25% compression of the rubber. These assemblies were each allowed to sit for 4 hours, and then exposed in a hot air oven to an applied temperature of 204° C. for 40 minutes to substantially fully cure the elastomer composition and accomplish the second stage cure. Lap Shear adhesion analysis in accordance with ASTM D816 as described above was then performed both at room temperature and at 100° C., with a pull rate of 0.5 inches per minute, and both the peak load achieved prior to failure and the percent rubber coverage were recorded. Percent rubber coverage indicates the level of cohesive versus adhesive failure that occurred for the test specimens.

The results set forth in Table 9 indicate excellent adhesion of all specimens to steel under both room temperature and elevated temperatures, and similarly reveal some degree of adhesion to aluminum. Notably, the compositions set forth in Table 10 were designed for adhesion to steel surfaces, and optimization of the respective compositions' adhesion to aluminum was not attempted for this illustration. The practitioner having ordinary skill in the relevant art would readily appreciate however that adhesion of comparable elastomer compositions to aluminum or any other metal could be optimized within the scope of the present invention according to known methods, such as by altering one or more composition constituents or their relative amounts in the composition, e.g., adhesive adjuvant and/or curative.

contaminant. Thereafter, the partially cured elastomer slabs were introduced between the treated steel slabs, the assemblies allowed to stand for approximately 4 hours, and then the assemblies were cured in a second cure stage performed at and applied temperature of 204° C. for and exposure period of 40 minutes to substantially fully cure the elastomer composition. The so formed Lap Shear adhesion analysis specimens were then pulled in accordance with ASTM D816 as described above, at a rate of 0.5 inches per minute.

As indicated above, it is generally accepted in the art that rubber-to-metal bonding utilizing an adhesive at the rubber-to-metal interface requires extensive and thus costly preparation of the metal surface. In general, the metal must be clean, free of any oils, lubricants and other contaminants. The results provided in Table 10 indicate however that adhesion of rubber to metal in accordance with an embodiment of the subject invention is much more flexible and forgiving. Surprisingly, it has been found that better adhesion results when the rubber is held in contact with the contaminant-coated metal for a sufficient amount of time to allow the contaminant to soak at least partially into the rubber, e.g., from about 1 to 4 hours.

TABLE 9

| Compound Ingredients | E64 | E65 | E66 | E67 | E68 | E69 | E70 | E71 | E72 |
|---|---|---|---|---|---|---|---|---|---|
| Keltan 7441A | 175 | 175 | 175 | 175 | 175 | 175 | 175 | 175 | 175 |
| N472 | 40 | 50 | 50 | 50 | 50 | 50 | 88 | 40 | 40 |
| N550 | 80 | 70 | 70 | 70 | 70 | 70 | 0 | 80 | 50 |
| FRANKLIN T-14 | 0 | 50 | 0 | 0 | 0 | 0 | 0 | 0 | 0 |
| DIXIE 2.6 | 0 | 0 | 50 | 0 | 0 | 0 | 0 | 0 | 0 |
| MISTRON VAPOR | 0 | 0 | 0 | 50 | 0 | 0 | 0 | 0 | 0 |
| MCNAMEE CLAY | 0 | 0 | 0 | 0 | 50 | 0 | 0 | 0 | 0 |
| SUNPAR 2280 | 60 | 60 | 60 | 60 | 60 | 60 | 20 | 60 | 50 |
| SARET SR-634 | 30 | 30 | 30 | 30 | 30 | 30 | 30 | 30 | 30 |
| HVA-2 | 1.5 | 1.5 | 1.5 | 1.5 | 1.5 | 1.5 | 1 | 1.5 | 2 |
| VAROX 130XL | 5 | 5 | 5 | 5 | 5 | 5 | 7.5 | 3.2 | 5 |
| VAROX 231XL | 3 | 3 | 3 | 3 | 3 | 3 | 1.8 | 5 | 5 |
| Adhesion Results- | | | | | | | | | |
| Peak Load (lbs./in$^2$), 20° C., on Steel | 580 | 476 | 368 | 479 | 310 | 488 | 741 | 307 | 236 |
| % rubber coverage, 20° C., on Steel | 25 | 50 | 10 | 100 | 5 | 15 | 80 | 5 | 5 |
| Peak Load (lbs./in$^2$), 100° C., on Steel | 371 | 365 | 286 | 243 | 270 | 306 | 321 | 107 | 102 |
| % rubber coverage, 100° C., on Steel | 75 | 100 | 75 | 95 | 75 | 100 | 75 | 20 | 10 |
| Peak Load (lbs./in$^2$)), 20° C., on Aluminum | 189 | 278 | 214 | 299 | 189 | 269 | 259 | 99 | 114 |
| % rubber coverage, 20° C., on Aluminum | 0 | 0 | 0 | 2 | 0 | 0 | 0 | 0 | 0 |
| Peak Load (lbs./in$^2$), 100° C., on Aluminum | 87 | 201 | 103 | 215 | 99 | 173 | 111 | 40 | 49 |
| % rubber coverage, 100° C., on Aluminum | 0 | 10 | 2 | 80 | 0 | 5 | 0 | 0 | 0 |

Illustration G

Effects of the presence of conventional rubber-to-metal assembly surface contaminants on the relevant metal surface are illustrated in Table 10. The contaminants listed in Table 10 are representative of common oils, lubricants and machining coolants conventionally employed in the assembly of rubber-to-metal bonded parts, exemplified by automotive crankshaft torsional vibration dampers. In each case, uncured elastomer specimens were prepared in accordance with the rubber mixing protocol set forth above, and Lap Shear adhesion analysis slabs were then formed via injection molding techniques, with a first cure of 165° C. for an exposure period of 2 minutes. In each case, the respective steel slabs were coated with a thin film of the noted

TABLE 10

| Contaminant: | Rubber | Peak Load (lbs./in$^2$) |
|---|---|---|
| Harmony AW-46, a clean hydraulic oil | E24 | 872 |
| " | E25 | 617 |
| Ultima EP-220, a clean gearbox oil | E24 | 764 |
| " | E25 | 636 |
| Dascoway 68, a clean Waylube oil | E24 | 767 |
| " | E25 | 376 |
| Drawsol 165 M, a clean draw compound | E24 | 453 |
| " | E25 | 748 |
| S500-US, 5% in water, a clean coolant | E24 | 587 |
| " | E25 | 531 |
| Used coolant, about a week old | E24 | 626 |
| " | E25 | 700 |
| Used coolant, about two weeks old | E24 | 487 |
| " | E25 | 560 |

As indicated above, the present invention is not intended to be limited to the practice of crankshaft torsional vibration dampers, but is instead applicable to any construction in which rubber-second substrate or rubber-to-metal bonding applies. Thus for example, in the construction of rolls, such as may be utilized in conjunction with the operation of printing presses or copy machines for instance, the subject invention would similarly provide improved production flexibility as described above. According to conventional practice, rolls are individually assembled by first applying a rubber-to-metal adhesive to a metal shaft, and then in a single curing step, vulcanization bonding uncured elastomer to the prepared shaft, generally within a suitably shaped mold to form the final vulcanized rubber profile. This process is costly in that rolls must be assembled individually, each through a separate rubber molding process. In accordance with the subject invention however, it is anticipated that one could instead prepare via conventional rubber molding processes, e.g., extrusion molding, a length or tube of partially cured elastomer having the appropriate cross-sectional dimensions. A first cure stage, sufficient to partially cure the elastomer to a point at which it could be handled or manipulated for storage and/or further production purposes without adverse impact on the dimensional integrity of the piece, could be imparted in the molding process itself. Subsequently the partially cured elastomer tube could be cut to an appropriate length for bonding in a subsequent second cure stage to the relevant metal shaft. Again, excellent rubber-to-metal adhesion could be accomplished utilizing such process in accordance with the present invention, and the need for a separate adhesive at the rubber-to-metal adhesive would be eliminated. Moreover, any slight rubber shrinkage that may occur during the second cure stage would provide additional force to hold the rubber in place against the metal shaft.

In further non-limiting examples of embodiments of the present invention, the two-step cure process described above could be utilized with advantage in adhering the relevant rubber member to the corresponding metal or plastic reinforcement member in the construction of bonded rubber articles such as reinforced hose and transmission belts such as flat belts, toothed- or synchronous belts, V-belts and multi-v-ribbed belts. Non-limiting examples of synchronous belts for forming same are disclosed in aforementioned U.S. Pat. No. 2,507,852 to Case; U.S. Pat. No. 3,250,653 to Geist et al. and U.S. Pat. No. 3,078,206 to Skura, the contents of which with regard to such processes is incorporated herein by reference.

In each such case, the relevant rubber member could be bonded to the relevant substrate, e.g., the metal or plastic or textile reinforcement member of a hose, or the metal or synthetic tensile member of the belt, by curing the rubber member in two stages, wherein at least the second cure step would be performed with the partially cured rubber in contact with the surface of such relevant substrate. In each case the utilization of the method in accordance with an embodiment of the present invention would provide the possibility of eliminating an adhesive or other intervening coating at the relevant rubber:substrate interface while providing improved process- or production flexibility as described above. Moreover it is contemplated that in the construction of synchronous belts, e.g., by the tooth preform method described in aforementioned U.S. Pat. No. 3,250,653 or the flow-through method described in aforementioned U.S. Pat. No. 3,078,206, utilization of the method in accordance with an embodiment of the present invention could provide improved control over the tensile cord position during the belt building process. This in turn would likely improve pitch fit consistency in production. One could for example partially cure an elastomer coating applied to the surface of the belt tensile cord or reinforcing fabric in a first cure step, thereby providing improved dimensional stability to the cord, then apply the so-formed assembly to the balance of the belt component parts in accordance with the additional belt building steps provided in e.g., the pre-form or flow-through method, and then complete the cure of the coating in a second cure step in order to bond the tensile cord or reinforcing fabric to the surrounding belt constituent members.

In general, the present invention provides in embodiments thereof a process for chemically bonding rubber to a second surface including a metal surface, and a bonded I part formed thereby, which allows for the elimination of an adhesive application at the relevant interface, and, according to one embodiment, provides improved production flexibility compared to conventional methods, while offering the practitioner the possibility of varying performance properties and elastomer characteristics as desired for a given application. Thus for example, two cure stages can be accomplished by controlling cure time and temperature utilizing a single curative or cure system, or can alternatively be accomplished utilizing two separate curatives, each being activated at a different stage such as by controlling exposure temperature. The concentration of two curatives within a single composition can moreover be varied over a wide range while maintaining a very high level of adhesion to substrates including metal, with generally predictable effects on rubber processing and physical properties. Thus for example, the amount of a first peroxide curative can be optimized to yield very high tear strength for ease of partially-cured rubber demolding. The amount of a second peroxide curative can moreover be optimized for low compression set in the finished part. While as noted above the present invention provides the ability to durably bond rubber to, e.g., a metal substrate, in the absence of a separate adhesive or other coating layer, the absence of such layer or composition at the relevant rubber:metal or rubber:substrate surface is not necessary in the practice of the present invention.

Although the present invention has been described in detail for the purpose of illustration, it is to be understood that such detail is solely for that purpose and that variations can be made therein by one skilled in the art without departing from the spirit or scope of the present invention except as it may be limited by the appended claims. The invention disclosed herein may suitably be practiced in the absence of any element not specifically disclosed herein.

What is claimed is:

1. A process for forming a bonded part comprising a rubber member and a first outer member and a second outer member, comprising the steps of:
   a. placing an uncured elastomer composition comprising at least one elastomer, at least one adhesive adjuvant and at least one curative into a shape-forming mold; and characterized in that the process further comprises the steps of:
   b. exposing said elastomer composition to a first cure step comprising at least one of a first temperature and a first pressure over a first exposure period sufficient to less than fully cure said elastomer composition;
   c. placing the so formed less than fully cured elastomer composition in contact with a surface of at least one of said first outer member and said second outer member;

d. exposing said less than fully cured elastomer composition to a second cure step comprising at least one of a second temperature and a second pressure over a second exposure period sufficient to substantially fully cure said elastomer composition; and e. compressing said less than fully cured elastomer composition between said first outer member and said second outer member prior to exposing said less than fully cured elastomer composition to said second cure step, such that said less than fully cured elastomer composition is deformed from 1% to 60% under compression between said first and second outer members.

2. The process of claim 1 wherein at least one of said first- and said second members is formed of metal, and wherein said adhesive adjuvant is a rubber-to-metal adhesive adjuvant.

3. The process of claim 1 wherein said less than fully cured elastomer composition is in direct contact with said surface of said at least one outer member with no adhesive on said surface, and wherein said less than fully cured elastomer composition is capable of substantially retaining the shape imparted to it by said mold when removed therefrom.

4. The process of claim 1 further comprising the step of removing said less than fully cured elastomer composition from said shape-forming mold prior to said second cure step.

5. The process of claim 2 wherein said at least one rubber-to-metal adhesive adjuvant is one selected from the group consisting of Type I coagent compounds, Type II coagent compounds, tackifiers, and a combination of at least any two of the foregoing.

6. The process of claim 2 wherein said at least one rubber-to-metal adhesive adjuvant is at least one selected from the group consisting of:
a. a metal salt of an alpha-beta unsaturated organic acid,
b. a bis-maleimide, and
c. a maleated polybutadiene resin.

7. The process of claim 1 wherein said at least one elastomer is selected from the group consisting of ethylene-alpha-olefin elastomer, ethylene/acrylic elastomer, polychloroprene rubber, acrylonitrile butadiene rubber, hydrogenated acrylonitrile butadiene rubber, styrene-butadiene rubber, alkylated chlorosulfonated polyethylene, epichlorohydrin, polybutadiene rubber, natural rubber, chlorinated polyethylene, brominated polymethylstyrene-butene copolymers, silicone rubber, styrene-butadiene-styrene block copolymer, styrene-ethylene-butadiene-styrene block copolymer, acrylic rubber, ethylene vinyl acetate elastomer, and a combination of two or more of the foregoing.

8. The process of claim 1 wherein said at least one curative is selected from the group consisting of a free-radical producing agent; sulfur; a sulfur-cure accelerator; an amine; and a combination of two or more of the foregoing.

9. The process of claim 3 wherein said surface is contaminated with oil or lubricant at the time of said compressing.

10. The process of claim 1 wherein said compression is from 5% to 50%.

11. The process of claim 1 wherein said elastomer composition further comprises a first curative and a second curative, said first curative exhibiting a first activation temperature and said second curative exhibiting a second activation temperature; and wherein said first applied temperature and time is sufficient to activate said first curative, and said second applied temperature and time is sufficient to activate said second curative and wherein each of said two curatives is an organic peroxide; and the activation temperatures of said two curatives differ by at least five degrees centigrade.

12. The process of claim 1 wherein said bonded part is selected from a torsional vibration damper, a rubber-viscous vibration isolation damper, a vibration isolator, a vibration isolation mount, a vibration damper, a coupling, a rubber roll, a transmission belt and a hose.

13. A process for forming a torsional vibration damper comprising a cured elastomer composition, a first metal surface and a second metal surface, comprising the steps of:
a. placing an uncured elastomer composition comprising at least one elastomer, at least one curative, and at least one rubber-to-metal adhesive adjuvant into a shape-forming mold;
b. exposing said uncured elastomer composition to a first pressure and a first applied temperature over a first exposure period sufficient to only partially cure the composition to a state of cure of from about 20% to about 99% as determined in accordance with ASTM D5289;
c. disposing said partially cured elastomer composition under compression between said first metal surface and said second metal surface sufficient to deform said partially cured elastomer composition in the range of from 1% to 60%; and
d. exposing said partially cured elastomer composition to at least one of a second pressure and a second applied temperature over a second exposure period sufficient to substantially fully cure said elastomer composition.

14. The process of claim 13 wherein said first pressure, said first applied temperature and said first exposure period are sufficient to cure the composition to a state of cure of from about 50% to about 95% as determined in accordance with ASTM D5289.

15. The process of claim 13 wherein said first pressure, said first applied temperature and said first exposure period are sufficient to cure the composition to a state of cure in the range of from about 70% to about 90% as determined in accordance with ASTM D5289.

16. The process of claim 13 further comprising the step of incorporating in said elastomer composition a first curative and a second curative, said first curative exhibiting a first activation temperature and said second curative exhibiting a second activation temperature; and wherein said first applied temperature and time is sufficient to activate said first curative, and said second applied temperature and time is sufficient to activate said second curative.

17. The process of claim 13 wherein said first metal surface and said second metal surface are contaminated with oil or lubricant at the time of said disposing; and whereby said cured elastomer composition is bonded to said first metal surface end said second metal surface in the absence of adhesive.

18. The process of claim 13 wherein said compression is in the range of from 5% to 50%.

19. The process of claim 1 whereby said rubber element resides in a state of compression in said part at a temperature in the range of from −20° C. to 120° C. in the absence of an external compressive force on said outer members.

20. The process of claim 13 whereby said cured elastomer composition resides in a state of compression in said damper at a temperature in the range of from −20° C. to 120° C. in the absence of an external compressive force on said metal surfaces.

21. A method comprising:
a. placing an uncured elastomer composition comprising at least one elastomer, at least one adhesive adjuvant, and at least one curative into a shape-forming mold;
b. exposing said elastomer composition to a first cure step comprising a first temperature and a first pressure over a first exposure period sufficient to partially cure said elastomer composition, thus forming a partially cured rubber member;
c. applying a lubricant to at least one of said partially cured rubber member and a first outer member and a second outer member;
d. assembling the so-lubricated partially cured rubber member and outer members such that 1% to 60% compression is applied to said partially cured rubber member between said first outer member and said second outer member, thus forming an assembly; and
e. exposing said assembly to a second cure step comprising a second temperature over a second exposure period sufficient to substantially fully cure said elastomer composition;
whereby said rubber member is bonded to at least one of said outer members in the absence of an adhesive layer, and whereby said rubber member resides in a state of compression at a temperature in the range of from −20° C. to 120° C. in the absence of an external compressive force on said outer members.

22. The method of claim 21 wherein said applied compression is from 5% to 50%, and wherein said partially cured rubber member has a state of cure of from about 20% to about 99%, and whereby said rubber member is bonded to both said outer members in the absence of adhesive.

23. The method of claim 22 wherein said elastomer composition further comprises a first curative and a second curative, said first curative exhibiting a first activation temperature and said second curative exhibiting a second activation temperature; and wherein said first exposure temperature and period is sufficient to activate said first curative, and said second exposure temperature and period is sufficient to activate said second curative.

24. The method of claim 23 wherein each of said two curatives is an organic peroxide; and the activation temperatures of said two curatives differ by at least five degrees centigrade.

25. The process of claim 23 wherein the activation temperatures of said two curatives differ by at least fifteen degrees centigrade.

26. The process of claim 23 wherein said applied compression is in the range of from 10% to 40%, and wherein said state of cure is from about 50% to about 95%, and wherein the activation temperatures of said two curatives differ by at least twenty-five degrees centigrade.

* * * * *